May 16, 1961  H. A. OSGOOD, JR  2,984,150
MICRO-FILM CAMERA UNIT
Filed Dec. 20, 1956  7 Sheets-Sheet 1
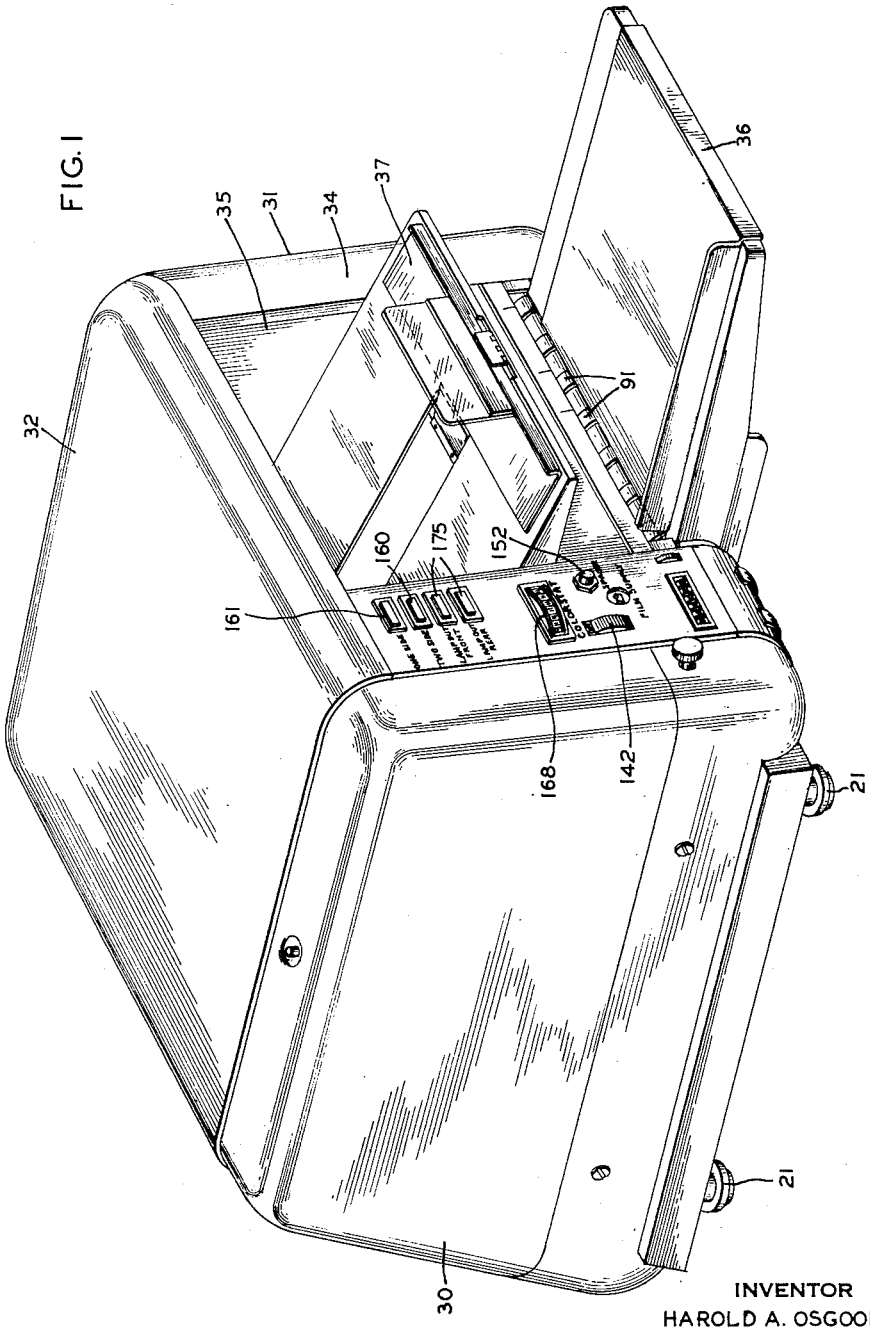
INVENTOR
HAROLD A. OSGOOD, JR.
BY Clyde A. Norton +
Robert J. Hulsizer
ATTORNEY

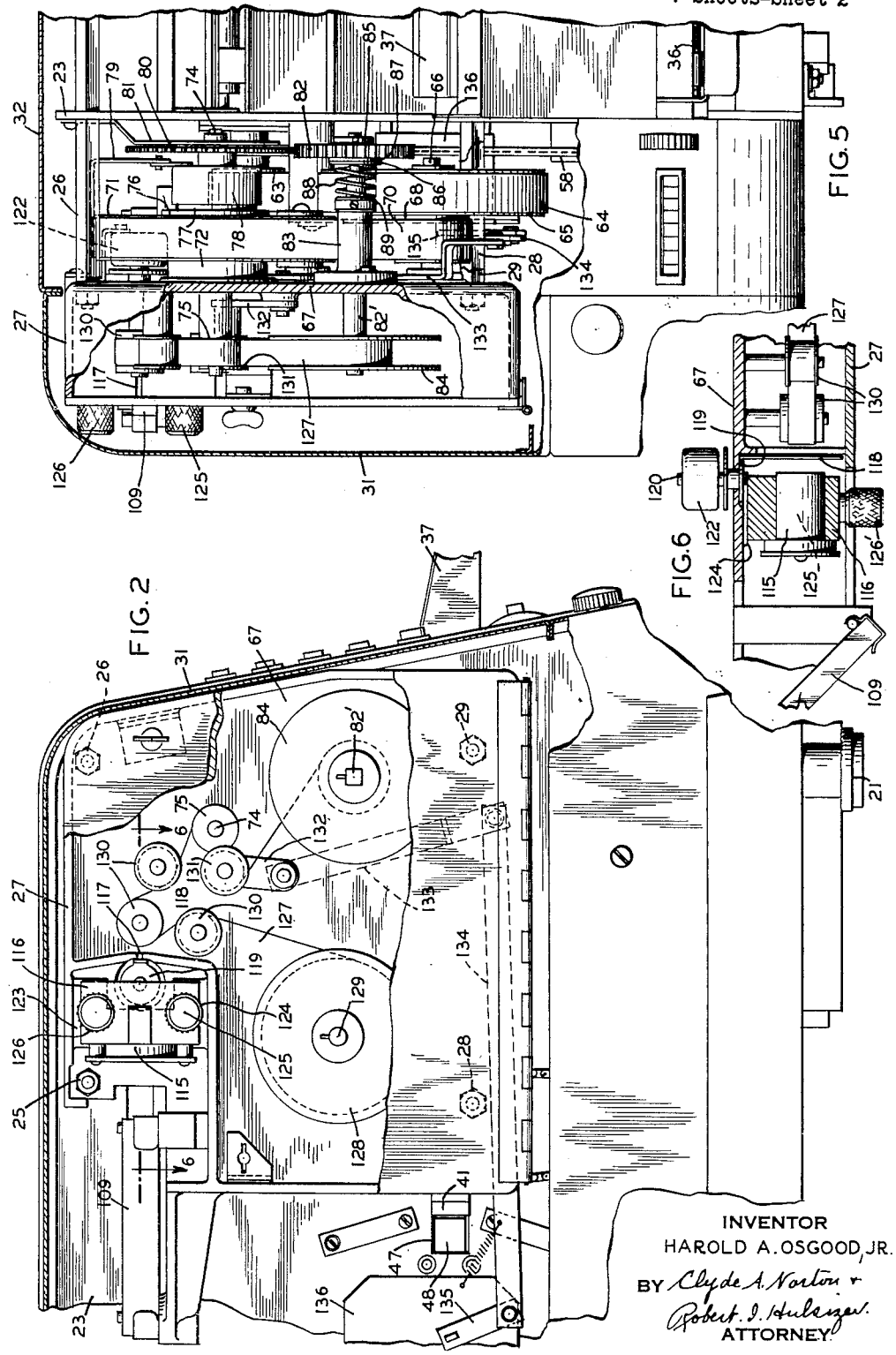

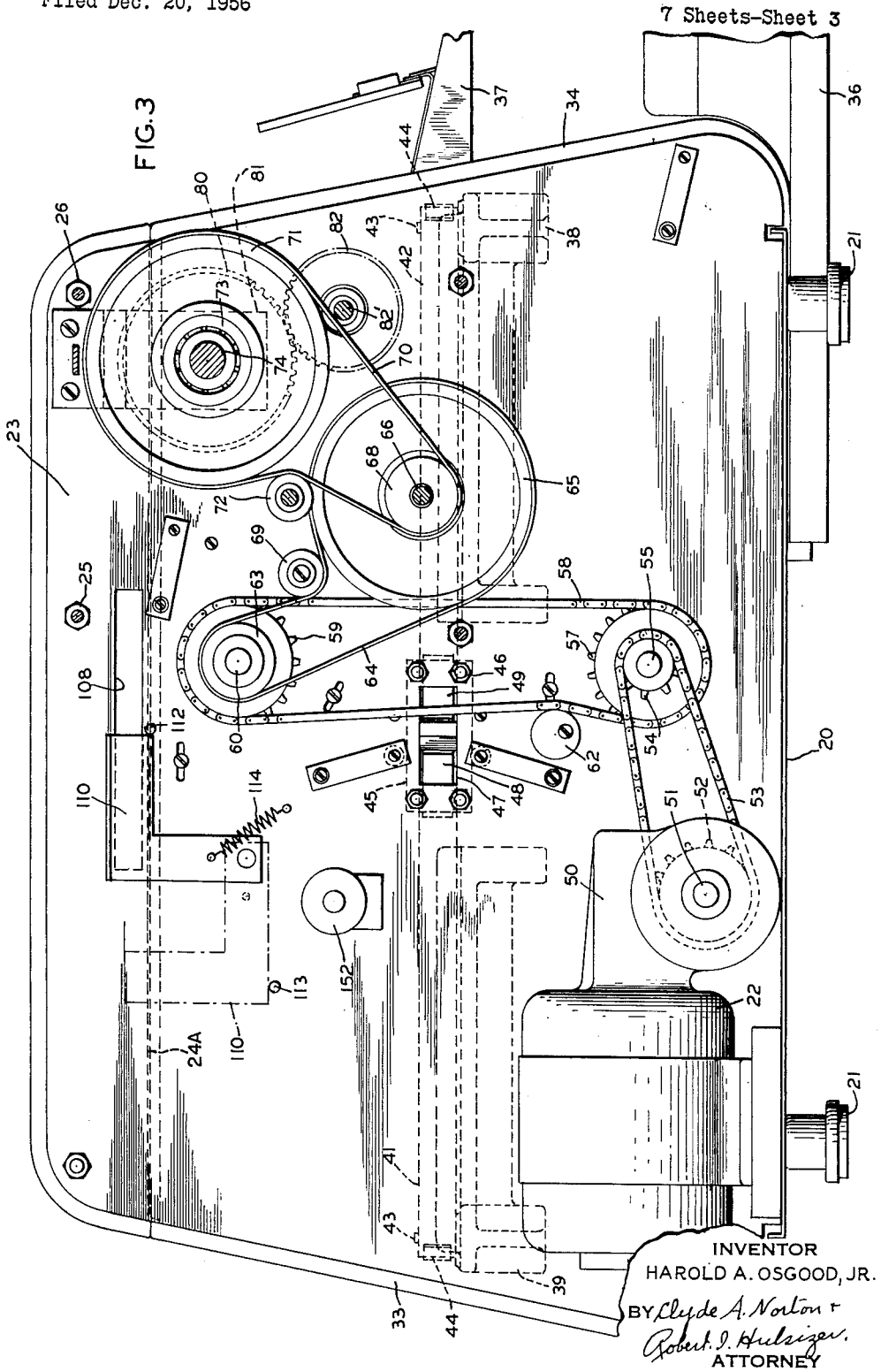

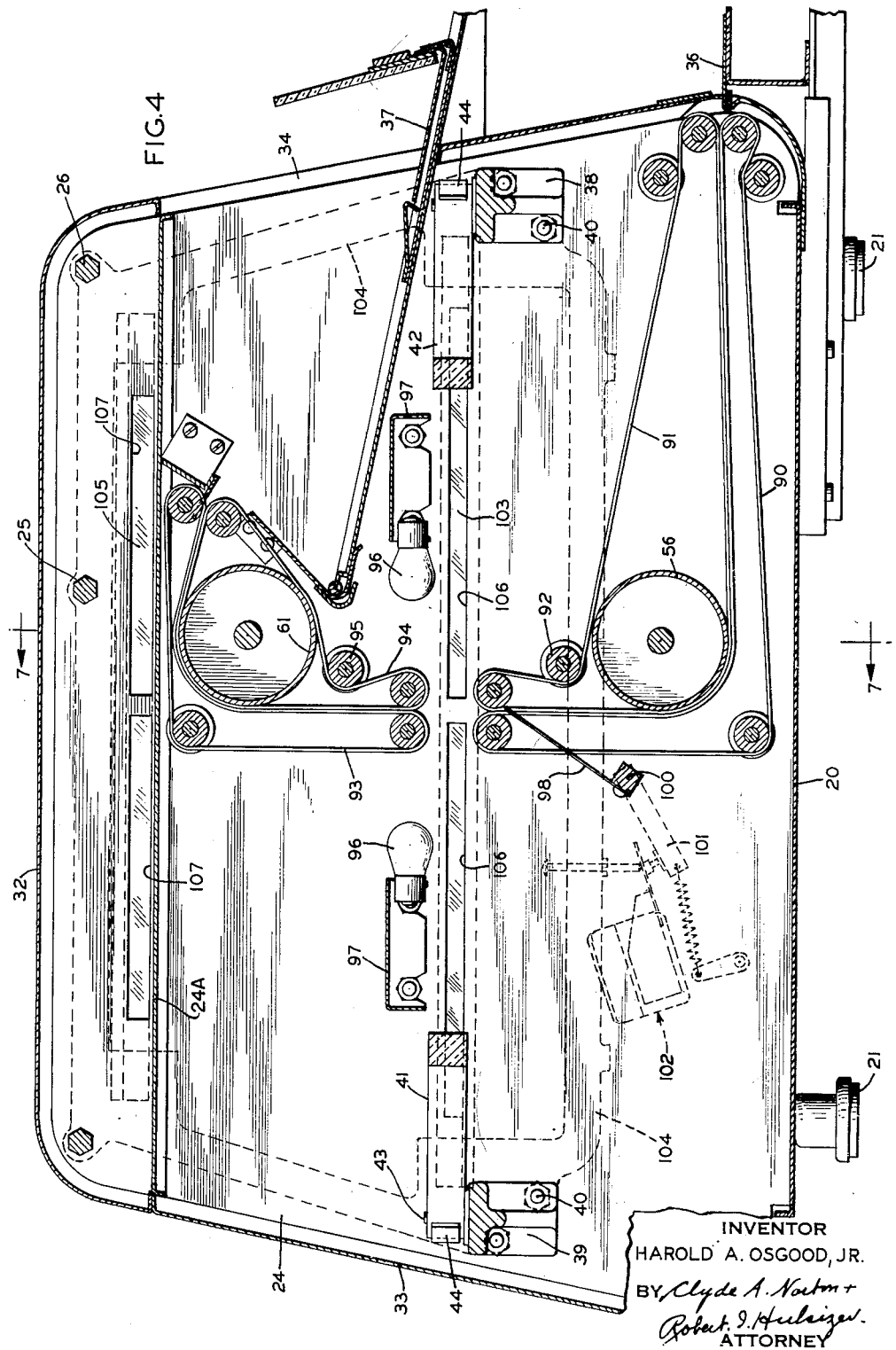

INVENTOR
HAROLD A. OSGOOD, JR.
BY Clyde A. Norton +
Robert I. Hulsizer
ATTORNEY

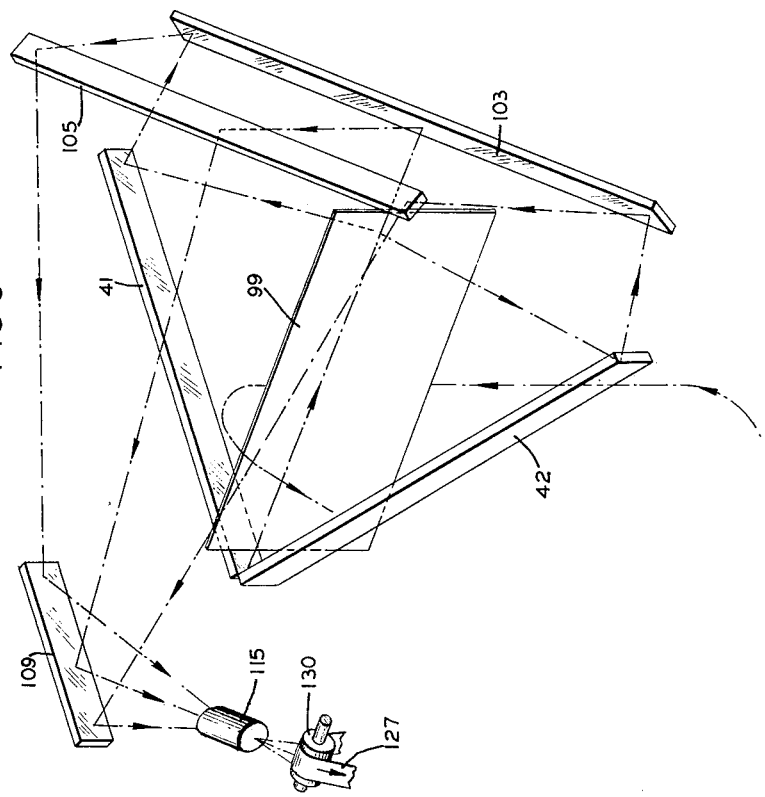
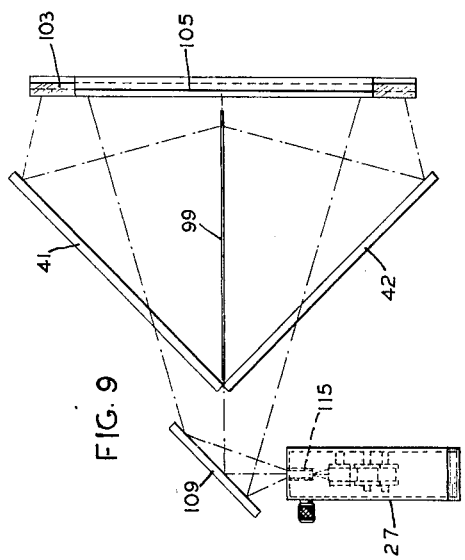
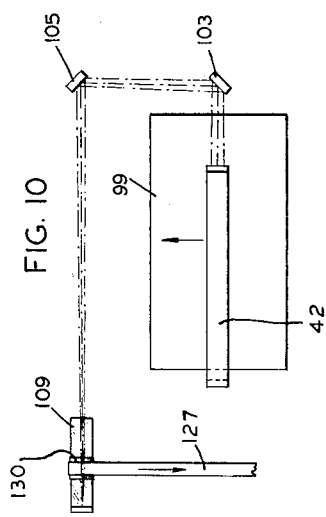

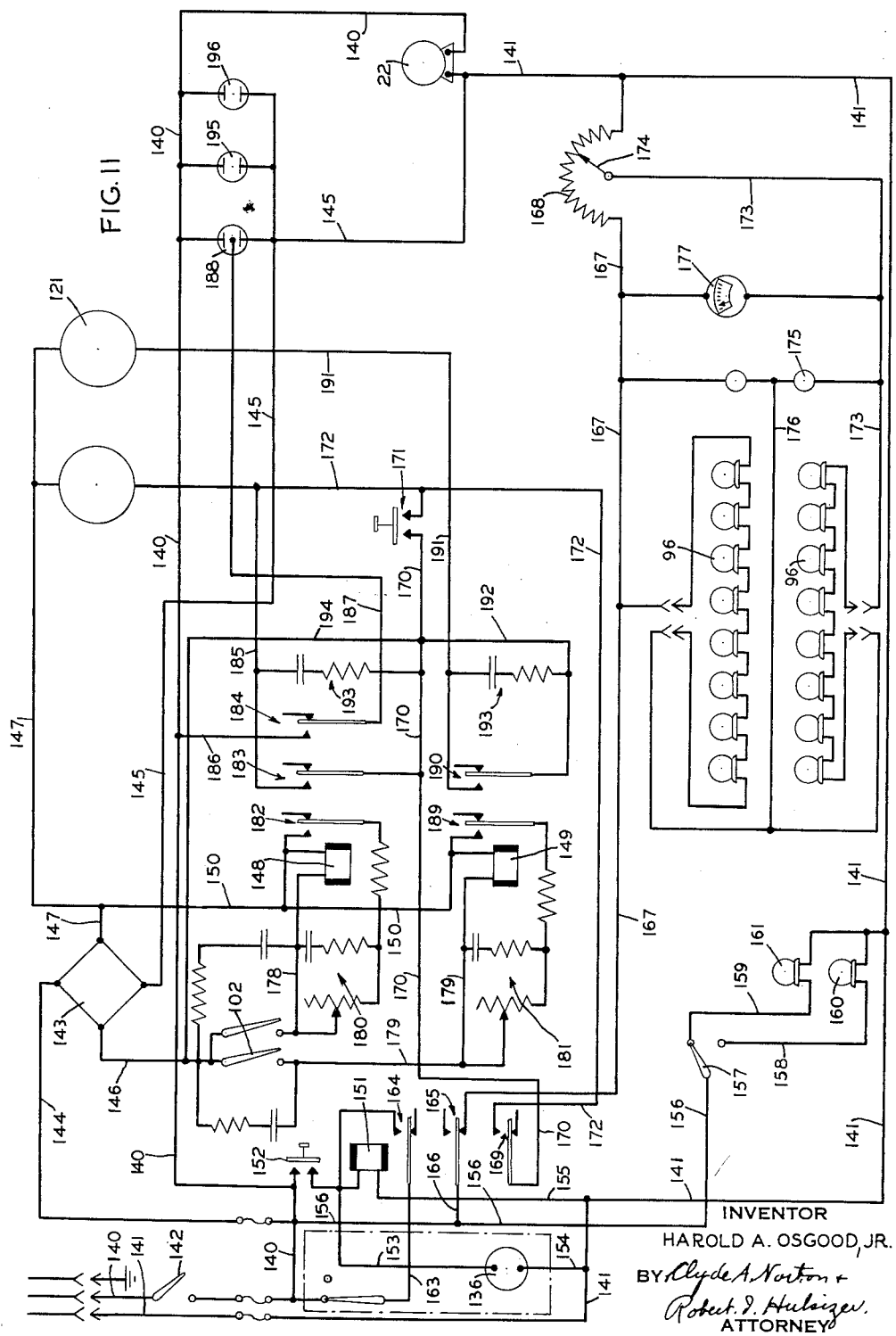

United States Patent Office 2,984,150
Patented May 16, 1961

2,984,150
MICRO-FILM CAMERA UNIT

Harold A. Osgood, Jr., Norwalk, Conn., assignor to Sperry Rand Corporation, New York, N.Y., a corporation of Delaware Filed Dec. 20, 1956, Ser. No. 629,514

4 Claims. (Cl. 88—24)

This invention relates to new and useful improvements in cameras and has particular reference to a camera for photographing documents flowing through the device in a continuous manner.

The main object of the invention is to provide a camera in which the optical path and the arrangement of drive elements are such as to permit the manufacture of a much smaller camera than has hitherto been possible.

A further object is to provide a frame construction within which the documents pass and in which they are photographed with the light reflected thereon passing around the structure within the covers by the aid of mirrors and finally being projected through a lens associated with the film camera. This optical path is "wrapped" around the frame structure and furnishes a proper path without requiring the enlargement of the structure.

A still further object is to dispose all of the drive mechanism to one side of the frame structure and with the axes of the several drive elements in parallel planes whereby the drive mechanism is simplified and more efficient, and occupies much less space.

Yet another object is to provide a simple and efficient mechanism whereby a "safety wrap" is achieved automatically whenever a button is pressed and its length is determined by the diameter of the film drive roller employed.

Further and more specific objects, features and advantages will more clearly appear from the detailed description given below when viewed in connection with the accompanying drawings which form part of the specification and which illustrate a present preferred form of the invention.

In brief and general terms, the invention concerns the provision of a micro-film camera in which is a frame structure including spaced vertical frame plates between which are disposed a system of document engaging belts, upper and lower drums to drive the belts, a pair of angularly disposed mirrors on opposite sides of the documents passing through the document chamber formed between the frame plates, and a pair of banks of lamps disposed to project light on opposite sides of the document. The light is reflected from the document surfaces on to the mirrors within the chamber and projected laterally therefrom through an elongated opening in the lower side of the frame on to another mirror disposed outside of the frame. This latter mirror projects the light upwardly to another mirror disposed outside the frame near the top thereof which then projects the light through another elongate opening in the frame near the top thereof and across the top through another elongate opening in the other wall of the frame to still another mirror disposed outside the frame wall. This last mirror projects the light forwardly into a lens unit mounted in association with a micro-film camera which is mounted on the side of the frame but spaced therefrom. This arrangement permits the optical path, as is evident, to be wrapped closely around the main frame structure of the machine within the covers thereof and permits of the use of a very small size of unit in contrast to former units which have been much greater in size and in cost of construction.

A further feature of the invention has to do with the dispositon of all the drive elements on one side of the frame structure in planes between the adjacent frame wall and the inner wall of the micro-film camera with all the axes of the various elements in parallelism whereby the drive is simplified, and can be disposed in a much more compact relation to reduce the volume occupied thereby and thus further facilitate the production of a much smaller unit than before. The only elements within the frame structure which are actuated by the drive mechanism are the two belt-driving drums above mentioned.

Still another feature of the invention has to do with the simple and efficient means whereby a "safety wrap" may be achieved and generally comprises a film driving roller, a linkage connected thereto which at its other end is connected to an adjustable element on a timer clock mechanism which operates to open a switch after a determined interval of time. More particularly an arm on the timer clock mechanism is automatically set by the above mentioned linkage in accordance with the diameter of the drive roller employed. The size of the drive roller depends upon the character of lens to be employed and the reduction ratio used between the size of the picture on the film and the size of the documents passing through the unit. The timer switch is normally closed and when a button is pressed its circuit is energized to start the clock mechanism and after an interval of time, determined by the setting of the arm, the switch is opened. When the button is pressed the lights are extinguished through operated relay contacts and not turned on again until the predetermined time interval has passed.

A present preferred form of the machine is shown in the drawings, of which,

Fig. 1 is a perspective view of the camera;

Fig. 2 is a partial left-side elevation with the outside cover removed and the camera cover partly broken away;

Fig. 3 is a longitudinal vertical section of the main drive mechanism with the outside cover and camera elements removed;

Fig. 4 is a vertical longitudinal section approximately through the center of the machine;

Fig. 5 is a front elevation, with the front cover removed, showing the main drive elements and the camera drive elements;

Fig. 6 is a horizontal section taken on the line 6—6 of Fig. 2;

Fig. 8 is a perspective view of the folded optical system;

Fig. 9 is a schematic plan view thereof;

Fig. 10 is a schematic front elevation thereof; and

Fig. 11 is a diagram of the circuit connections for the machine.

Figure 7:
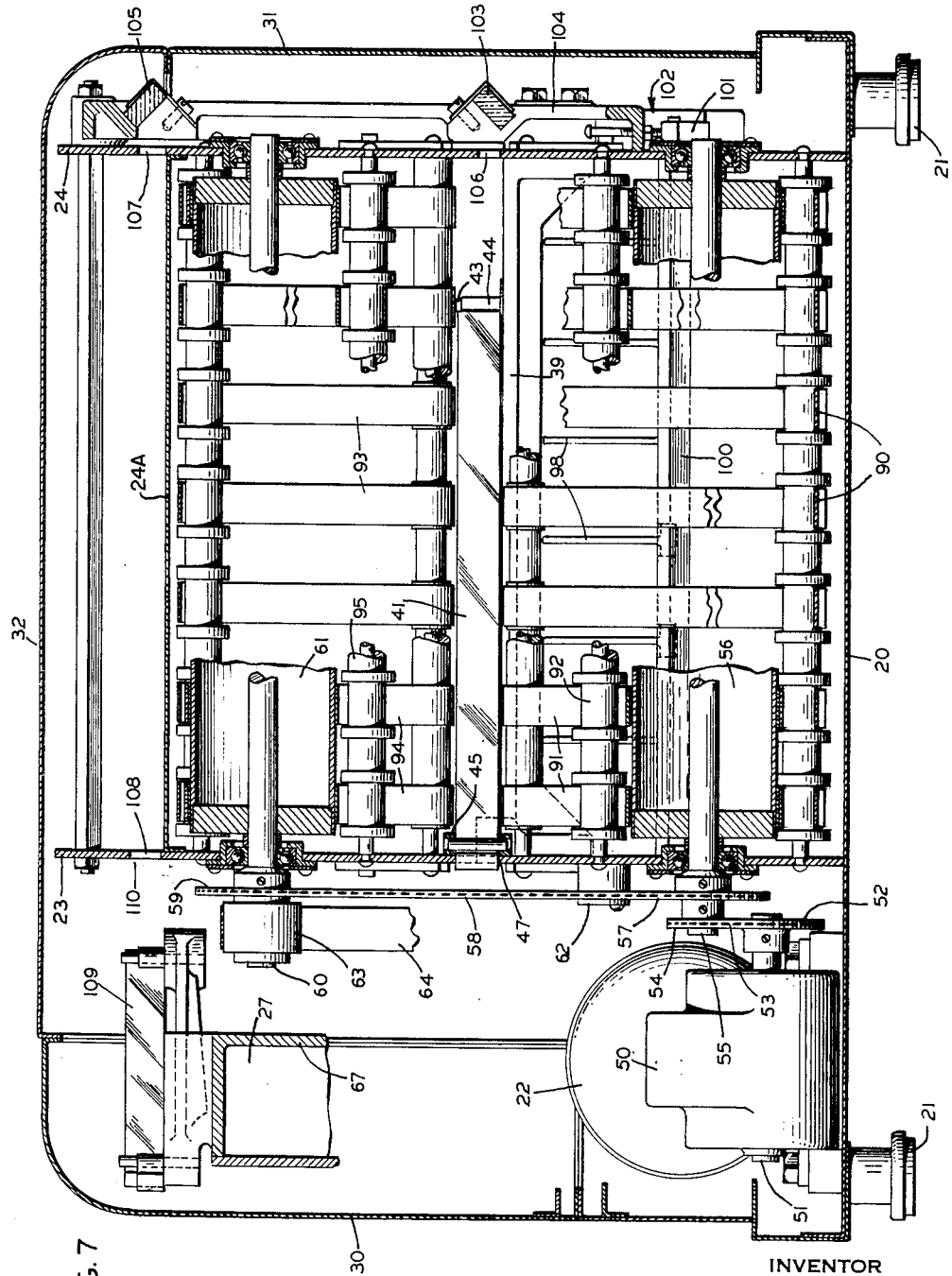
Fig. 7 is a vertical transverse section approximately through the center of the machine.

Referring now to the detailed drawings of the present preferred form of the machine, there is a basic frame construction comprising a base plate 20, supported by legs 21 near the four corners thereof. A drive motor 22 is supported on the plate 20 at the rear left corner thereof. A pair of vertical frame plates 23 and 24 are longitudinally and suitably supported in spaced relation on the base plate 20. They are held in spaced relation at the top by tie bolts 25 and 26 which extend to the left of the frame plate 23 and on their ends are connected to and support a camera casing 27. Adjacent the upper part of the frame a top plate 24A provides a closure therefor spaced from the top cover 32 of a housing for the machine or unit. The lower portion of casing 27 is supported by spacer bolts 28 and 29 extending from the camera casing 27 to the frame plate 23. As shown in Fig. 5 the camera casing 27 is disposed to the left of and apart from the frame plate 23 and in this space are disposed suitable drive elements to be later described. The camera unit housing is provided with side covers 30 and 31, a top cover 32, and a rear cover 33. All of these covers are, in any suitable manner, removably disposed. The front wall 34 of the camera unit housing has a large opening 35 in which may be disposed a lower copy delivery tray 36 and an upper copy-collector tray 37 of usual form. As a copy is delivered to the machine from the lower tray, it passes through the machine and emerges at the top on to the tray 37. These trays are in any suitable manner removably disposed. It will be seen from Fig. 4 that, when in position, the upper tray 37 acts as a baffle for the light within the camera.

U-shaped angle bars 38 and 39 are disposed respectively across the front and rear of the camera and at their ends are connected to the frame plates 23 and 24 by bolts 40. These bars support respective ends of mirrors 41 and 42 which are disposed in an angular relation and in a horizontal plane within the space between the frame plates 23 and 24. As shown in Fig. 4, pins 43 are fixed to these plates and curved U-shaped clips 44 are at their ends connected to the pins. The respective ends of the mirrors bear against the pins to accurately position them and are received within the clips as shown. This affords an easy and reliable means to position the mirrors. The opposite ends of the mirrors 41 and 42 rest in an opening in a small plate 45 which is bolted as at 46 to the inside wall of the frame plate 23. There is also an alined opening 47 in plate 23 through which the ends of the mirrors extend sligthly as shown in Fig. 3. Small angularly disposed guide plates 48 and 49 are mounted on the plate 45 and against these small plates 48 and 49 the respective ends of the mirrors 41 and 42 rest. Further description of the relation and operation of these mirrors will be subsequently described.

*Document drive mechanism (Figs. 3, 4, 6 and 7)*

The motor 22, the shaft of which extends longitudinally of the camera, is provided with a worm gear box 50 which drives a transverse shaft 51. On shaft 51 is a sprocket 52 over which runs a chain 53, the other end of which runs around a sprocket 54 fixed to a shaft 55. This shaft extends through the frame plates 23 and 24 and is journalled in bearings in the plates 23 and 24 as shown in Fig. 7. On this shaft 55, between the plates 23 and 24, is fixed a belt-drive drum 56, the operation of which with respect to other parts will presently be described.

To the shaft 55 is fixed another sprocket 57 over which runs one end of a chain 58, the other end of which runs around a sprocket 59 fixed on a shaft 60. This shaft, similarly to shaft 55, extends through the frame plates 23 and 24 and is journalled in bearings in these plates. On this shaft between the plates 23 and 24 is fixed a belt-drive drum 61, the operation of which with respect to other parts will presently be described. The chain is tensioned by contact with an eccentrically mounted disc 62, of suitable material such as plastic, which also acts as a brake to stop the motion when the motor stops. This disc is adjustably mounted on the side of the plate 23.

The shaft 60 also carries a pulley 63 fixed thereto. Over this pulley runs a belt 64 which passes around a pulley 65 rotatable on a stub shaft 66 mounted on the adjacent wall 67 of the camera casing 27. Fixed to the pulley 65 and rotatable therewith is another pulley 68. A guide roller 69 mounted on the frame plate 23 keeps the belt 64 in proper tension. Over this pulley 68 passes another belt 70 which extends up and around still another pulley 71 and is kept under proper tension by a guide roller 72 which is mounted on the wall 67 of the camera.

The pulley 71 is mounted for rotation on a sleeve-like bushing 72 which is fastened to the adjacent wall 67 of the camera casing 27. Between the bushing and the inner bore of the pulley is a ball bearing element generally indicated at 73. Within the bushing 72 a shaft 74 is adapted to rotate. This shaft 74 extends to the left in Fig. 5 through an opening in the camera wall 67 and has on that end a film drive roller 75. To the right side of the pulley 71, as viewed in Fig. 5, is fastened an armature plate 76. This armature plate is disposed closely adjacent to a rotatable element 77 of a well known magnetic clutch mechanism, the other fixed element 78 of which is held from rotation by a link 79 at one end connected to the frame and the other end of which is welded to the wall of the element 78. The element 77 of the clutch is rotatable and mounted on a sleeve fixed to the shaft 74. This mechanism is described only generally since it is a well known mechanism the details of which, per se, form no part of this invention. However, when the clutch is energized in a manner to be hereinafter set forth, the armature element 76 is drawn tight against the face of the clutch element 77. Since the armature is rotating with the pulley 71, this will cause the element 77 to rotate and thus turn the shaft 74 and turn the drive pulley 75.

On the right end of the shaft 74 as viewed in Fig. 5, there is mounted a gear 80 against the face of which bears a resilient spring plate 81 to act as a brake. This plate at one end is fixed to the frame plate 23. The gear 80 meshes with a smaller gear 82 on a shaft 82' which extends through a sleeve bushing 83 fixed to the wall 67 of the camera casing 27. This shaft extends through the wall of the camera and on its end therein supports a film take-up reel 84. The gear 82 is rotatable on shaft 82'. A collar 85 on the right end of shaft 82', as viewed in Fig. 5, is fastened to the shaft 82' and a pair of discs 86 and 87 are disposed against the gear 82 on the side opposite the collar 85 and the pressed against the gear by means of a coiled spring 88, the other end of which bears against another collar 89 fixed to the shaft 82'.

The mechanism thus far described concerns a feature of the invention, namely, the formation of the drive for the documents through the machine and the operation of the camera in a very small compass with all drive and other shafts in parallelism, thus simplifying the construction and reducing the expense of manufacture and assembly and permitting the construction of a much smaller camera than has been hitherto possible

*Document feed mechanism (Figs. 4 and 7)*

Previously mentioned upper and lower shafts 60 and 55 extend into the device between the frame plates 23 and 24 and carry belt drive drums 61 and 56 thereon. In general the drive of the belts which pass the documents through the apparatus is of the usual type. A plurality of pairs of narrow spaced tape-like belts 90 and 91 are related to the lower drum 56 and pass around a series of guide rollers such as 92 in such a manner that they lie closely adjacent each other from the rollers near the delivery tray 36 to the drum 56, around the drum and up to the pair of guide rollers disposed just below the photographic zone which is indicated by the letter X. Here the belts separate and pass back to the entry position. The upper drum 61 is in like manner related to a plurality of pairs of narrow tape-like belts 93 and 94 which are guided by a series of guide rollers 95 whereby the document passing up through the photographic zone X is received between these belts closely disposed and passed up around the drum 61 and then passed out between a pair of exit rollers 95 to drop upon the collector tray 37.

Just above the level of the photographic zone X and on opposite sides of the document passing up through said zone are banks of lamps 96 mounted on brackets 97 which extend across between the frame plates 23 and 24. Means later described permit the banks of lamps to be illuminated together. Feeler fingers 98 are disposed with their ends across the path of the document 99 (Fig. 8) so that when the front edge of the document encounters the fingers they will be slightly moved with a pivoted bar 100 on which they are mounted. This bar is connected by suitable linkage, generally indicated by the numeral 101 to one or more micro-switches, generally indicated by the numeral 102. These micro-switches are adapted, when closed, to energize certain solenoids associated with a clutch and a shutter as will be explained. Similarly, when the document's rear edge passes beyond the ends of the fingers 98, the micro-switches will be opened and the respective solenoids will be deenergized.

Wrapped optical system (Figs. 7 to 10)

Referring to Fig. 8, the optical system of mirrors is shown diagrammatically and the mirrors 41 and 42 are shown in angular relation respectively to the rear and to the front of the document 99 with their left ends lying closely adjacent. These mirrors are mounted as previously described. When the banks of lamps 96 are illuminated, the light will be thrown on the front and rear faces of the document and will be projected on to the mirrors 41 and 42 and from them to the right on to an elongated mirror 103. This mirror 103 is mounted on a casting plate 104 fixed to the outside of the frame plate 24 and is disposed thereon in a 45 degree angle to throw the light received from the mirrors 41 and 42 upwardly in a vertical direction to another mirror 105 similarly mounted on the casting 104 and at a 45 degree angle to receive the light from the mirror 103 and to reflect it horizontally across the top plate 25A of the frame structure. An aperture 106 in the frame plate 24 is coextensive with the length of the mirror 103 and permits the light to pass from mirrors 41 and 42 to the mirror 103. Similarly an elongate aperture 107 is formed in the frame plate 24 adjacent the mirror 105 to permit the light to be projected therethrough across the top of the mechanism but below the cover plate 32. In like manner an aperture 108 is formed in frame plate 23 to permit the light from mirror 105 to fall on another mirror 109 which is mounted, as shown in Fig. 2, on a rear portion of the camera casing 27 at an angle of 45 degrees to receive the light from the mirror 105 and project it forwardly in a line parallel to the frame plate 23, and into the camera. Thus there has been provided a wrapped optical path for the light which passes around the periphery of the device within the cover plates, which formation permits the light to pass around the interior mechanism after it has passed through the first elongate aperture 106 without interfering with the interior mechanism for feeding the documents through the machine. This is an important feature of the invention and allows the production of a much smaller casing for the machine.

In some instances it is desired to allow light to pass only through the forward half of the aperture 108, especially when images are to be projected only on one half of the film in the camera. To achieve this result, a shutter plate or "flag" 110, generally L-shaped, is pivoted at its lower end at 111 to the outside of the frame plate 23 as shown in Figs. 3 and 7. In the full line position the flag is limited against a stop element 112 and in its dotted position by a stop member 113. A spring 114 at one end is fixed to the frame plate 23 and to the flag at the other end. The spring is related to the pivot point of the flag to act as a toggle to hold the flag in its operative or inoperative positions.

Camera and its operation (Figs. 2, 5 and 6)

The lens 115 (Fig. 8) is mounted in a block 116 and is disposed eccentrically therein with respect to a horizontal plane therethrough as clearly seen in Fig. 6. The axis of the lens is in line with an aperture 117 in the wall of the camera casing. The block 116 is mounted on top of the camera wall outside the portion of the camera casing which contains the film reels. A shutter plate 118 is adapted to be positioned, when desired, across the aperture 117 to block off the light from the interior of the camera casing containing the film. This plate is mounted on and extends from a disc 119 fixed on the shaft 120 of a solenoid motor 122 which is operated as later described. When pictures are to be projected on to the film the shutter 118 is automatically moved out of the way as hereinafter described.

The block 116 is slidable into position between upper and lower guide plates 123 and 124 and is held in position on bolts 125 fixed to plate 67. These bolts extend through holes in the block and have threaded ends to receive holding nuts 126. To remove the lens block 116, the nuts are removed and the block is slid off the bolts, out between the guide plates 123 and 124. At this time a new lens unit may be inserted within the block, because lenses of differing focal length may be employed as desired to achieve different reduction ratios between document size and picture size on the film. When it is desired to take pictures on only one side of the film, the flag 110 is disposed in operative position and light will pass only through the forward portion of the elongate aperture 108 and thus only the front face of the document will be projected on the film. For purposes of projecting pictures on a particular side of the film the block 116 may be removed and turned reversely around a horizontal longitudinal axis so that the eccentric position of the lens unit in the block 116 is shifted as is obvious. In either case of projecting pictures on only one side of the film, the flag is always in operative position to block off the rear portion of the aperture 108. When reversed, the block 116 is slipped on to the bolts 125 and the nuts then screwed on.

Film control and operation (Fig. 2)

The film 127 is supplied from a reel 128, mounted on a shaft 129 rotatable in a bearing on the wall 67 of the camera casing and its unreeling motion is resisted in any well known manner (not shown) by spring action so that it will not over-run. The film then passes over guide and tensioning rollers 130 mounted on the said wall and passes around a drive roller 75 on shaft 74, the driving of which has been described. Pressing against the drive roller 75 is another roller 131 mounted on an arm 132 pivoted to the wall 67. It then passes to the take-up reel 84, the drive of which has been previously described. The ratio of gears 80 and 81 is such that the supply reel is turned slightly faster than the film is moving.

Safety wrap mechanism (Fig. 2)

The arm 132 is extended as at 133 beyond the pivot point and this extension is pivotally connected to a link 134 which at its other end is connected to the lower end of an arm 135 on a type of well-known timer mechanism 136. A switch in the timer mechanism (not shown) is normally closed and is opened after a determined interval of time which is determined by the setting of the arm 135. The setting of the arm 135 is determined through the described link 134, extension 133, arm 132, roller 131, and drive roller 75. For given reduction ratio between the document size and the image size to be projected on the film a definite focal length of lens is used and a drive roller 75 of definite diameter. When a different reduction ratio is to be employed a different lens and a larger or smaller drive roller is used and this will position the roller 131 differently and cause the above linkage to move and set the arm 135 at a different but proper angle to determine the time interval before the switch controlled by the timer is opened. The operation in the circuit of the timer switch is to be explained in the subsequent description of the circuit and the operation of its parts. This safety wrap control is also a feature of the invention herein. A manual switch is operated at the beginning of each desired length of film and at the end thereof. This is because the film is loaded in the daylight and a length of the film becomes fogged and the device is thus operated a definite time to wrap up this fogged portion before the lamps are turned on and picture projection takes place. At the end of a desired length of film a safety wrap operation is performed to wrap a definite length of film around the exposed film to protect the exposed film when the film is removed since it is removed in daylight and a few layers of film are always fogged. When the safety wrap is taking place at either end of the film the lamps are not lit, as will be seen in the description of the circuit and its operation.

*Circuit layout and general operation (Fig. 11)*

Referring to Fig. 11. From a source of alternating current power, two power lines 140 and 141 extend. Line 140 passes through a main switch 142 to one side of motor 22. The other line 141 passes to the other side of the motor 22. Therefore whenever this switch is closed, the motor starts to run. This motion through the drive mechanism previously described will operate the document belt-drive drums as well as the pulley associated with the magnetic clutch. When the magnetic clutch is operated the film drive roller is turned as well as the film take-up reel.

A rectifier 143 is connected to line 140 by wire 144 and to return line 141 through wire 145. The D.C. side of the rectifier is connected by wire 146 to a pair of micro-switches 102 and by wire 147 to one side of the clutch and shutter solenoids. A pair of relays 148 and 149 are connected in parallel to wire 147 by wire 150. A timer relay 151 is connected to line wire 140 by a safety wrap button 152 which is momentarily and manually operated. In parallel with relay 151 by wire 153 is a timer clock mechanism 136. The opposite sides of the clock mechanism 136 and the timer relay 151 are connected respectively by wires 154 and 155 to the line 141. A wire 156 is connected to line wire 140 and leads to a switch 157 (not shown in other drawings) connected to and operated by the movement of the previous flag 110. The two contacts of this switch are connected by wires 158 and 159 respectively to lamps 160 and 161. The other sides of these lamps are connected to the line 141. In the position of the switch 157 shown the lamp 161 is lit and indicates that the flag 110 is in operative position blocking off the rear half of the aperture 108 as previously stated. When the switch is in the other position the lamp 160 is lit indicating that both sides of a document are being photographed.

A normally closed timer switch 162 is connected on one side to line 140 and on the other side by wire 163 to a normally open holding contact 164 for relay 151 operated when said relay is energized. A normally closed contact 165 actuated by relay 151 is connected on one side by wire 166 to wire 156 and on the other side by wire 167 to one side of a rheostat 168, the other side of which is connected to line 141. A normally open contact 169 of relay 151 is connected by wire 170 to a manually operated spacer button 171, the other side of which is connected to one side of the clutch solenoid 78 by wire 172. When closed the contact 169 connects to wire 172. It is evident that the contact 164 functions as a holding contact for the relay 151, the contact 165 acts to open the lamp circuit and contact 169 acts to energize the clutch solenoid.

The banks of lamps 96 are connected in series. On one side they are connected to wire 167 and on the other side by wire 173 to the adjustable arm 174 of the rheostat 168. A pair of neon lamps 175 are disposed across between wires 167 and 173 and a wire 176 extends from a point between lamps 175 and a point between the respective banks of lamps 96. A voltage meter 177 is also connected across between wires 167 and 173. With this arrangement when any lamp in the banks goes out, the corresponding neon light is illuminated to indicate this condition.

The micro-switches 102 operated by the documents passing through the device, when operated, are respectively connected by wires 178 and 179 to one side of the relays 148 and 149, the other sides of which, as previously stated, are connected by wire 150 to the wire 147. With these relays 148 and 149 are related suitable spark-suppression and time delay networks generally designated by the numerals 180 and 181. The relay 148, when energized, operates contacts 182, 183 and 184. The contact 182 is normally open and when closed forms a holding circuit for the relay through network 180. This delaying circuit is to keep the relay energized even after the related micro-switch 102 is opened by the passage of the rear end of a document beyond it, so that the rear portion of the document will have time to pass the photograph zone X before the relay is deenergized. The contact 183 is normally open and, when operated, closes a circuit from wire 170 over wire 185 to wire 172 leading to one side of the clutch solenoid. The contact 184 is normally open but, when closed, establishes a circuit through wire 186 to line 140 and through wire 187 to a power socket 188 for a stacker unit which may be used with the device to stack the documents after they have passed out of the machine.

The relay 149 is provided with contacts 189 and 190. The contact 189 is similar in its function to contact 182 associated with relay 149 to hold the relay energized until the delaying network allows it to open. The contact 190, normally open, when closed establishes a circuit between wire 191 leading to one side of the shutter solenoid and wire 192 connected to wire 170. The networks generally designated as 193 associated with contacts 184 and 190 are for the suppression of sparking at the contacts. A wire 194 is connected between wire 170 to the left of spacer button 171 and the wire 146 leading to one side of the rectifier 143. Extra convenience sockets 195 and 196 are connected across between line 145 and line 140 for any other suitable uses.

*General description of entire operation*

The film is loaded into the camera and the main switch 142 is closed. This starts the motor 22 which drives the belt-driving drums within the frame plates 23 and 24 and also drives the pulley 71 which is free to rotate on its shaft through ball bearings at the same time the light circuit is energized through normally closed contacts 165. Because a certain length of film has become fogged due to daylight loading, it is necessary to wind up this certain amount before the lights are turned on and photographing of the documents takes place. It is to be remembered that with a determined character of lens in the camera and with a determined size of film drive pulley employed therewith the linkage connected to the timer clock has been thus set to open the timer switch 162 after a determined period of time. With these conditions existing, the safety wrap button 152 is manually and momentarily pressed, and the safety wrap relay 151 is energized to pull up its three normally open contacts 164, 165 and 169. The timer clock mechanism 136 is also energized with the relay 151. Contacts 164 hold the relay 151 energized; contacts 165 cut off the lamp circuit; and contacts 169 energize the clutch solenoid 78. Then the take-up reel on the camera is turned to wind up the safety wrap length of film. When the timer clock switch is opened the timer clock circuit and the relay 151 circuit is opened and the contacts of relay 151 drop back to normal thus closing the light circuit and opening the circuit to the clutch solenoid 78.

The arm 174 of the rheostat 168 is set for the proper illumination of the lamps 96, and the flag 110 is set in one or another position depending upon whether only one or both sides of the documents are to be photographed. As a document is fed into the machine, it is passed up through the photographic zone X and before this happens, the fingers associated with the micro-switches 102 have closed the switches and energized the relays 148 and 149. The contacts of these relays are operated. Through the contacts of relay 148 a holding circuit for itself is established through contacts 182 and this relay is held energized for a determined period of time due to the delay network associated therewith and for the reasons previously set forth. The contacts 183 of relay 148 when closed establish a circuit for the clutch solenoid 78. The contacts 184 establish a circuit for the stacker socket so that a stacker may be operated if desired.

The energization of relay 149 operates its contacts to establish through contacts 189 a holding circuit for itself which is held for a determined time in the same way the relay 148 is held. Contacts 190 when closed establish a circuit for the shutter solenoid so that the shutter which is normally disposed across the opening between the lens and the interior of the film chamber is moved out of the way, and photographing of the document can proceed.

If documents are fed into the machine in close order, the relays 148 and 149 due to the delaying circuits are maintained energized and the feed of film continues. When a desired amount of film is passed through the device a bell mechanism (not shown) is operated and when this takes place the safety wrap button is again pressed which cuts off the light, starts the timer clock and holds the relay 151 energized until the timer switch 162 is again opened. This then wraps a determined length of film around the photographed length to protect it when the reel of film is taken out of the camera in daylight. If it is desired to move the film a short distance to provide a gap between pictures or groups of pictures for ready identification or cataloguing purposes, it is merely necessary to press the spacer button 171 which will connect the clutch to the power and move the film which moves as long as the button is held down. If a designated group of documents are passed into the machine and the film motion is stopped when they pass, the spacer button can be actuated to move the film the desired distance to separate this group from the next group to be inserted into the machine.

Turning to the document feed, it is obvious that when the main switch is closed the belt-driving drums within the frame structure are turned. As the documents enter, the micro-switches 102 are actuated. If both sides are being photographed, the flag 110 is out of the way of the aperture 108. The light is projected on the document on both sides and then is reflected laterally through the aperture in the frame plate 24 to the lower mirror, then up along the outside of the frame structure to the upper mirror. It then is projected across the top of the machine above the frame structure beneath the cover and through the aperture 108 to strike the mirror on top of the camera casing which projects it forward parallel to the frame structure into the lens. This optical path is thus shortened and wrapped around so that a much smaller camera casing may be employed.

While I have described what I consider to be a highly desirable embodiment of my invention, it is obvious that many changes in form could be made without departing from the invention and I, therefore, do not limit myself to the exact form herein shown and described, nor to anything less than the whole of my invention as hereinbefore set forth and as hereinafter claimed.

I claim:

1. A micro-film apparatus having a long light path in a relatively small structure, said apparatus comprising a base, a housing mounted on said base, a frame structure mounted on said base within said housing, said frame comprising a top plate generally parallel to but spaced from said base and first and second side plates disposed in parallel spaced relation at approximately right angles to said base and said top plate and extending beyond said top plate, said top and side plates forming an inner chamber within said housing, said inner chamber being smaller than the interior of said housing with said top and side plates being spaced from the corresponding inner surfaces of said housing, said first side plate having upper and lower horizontally disposed elongated apertures and said second side plate having an upper aperture aligned with the upper aperture of said first side plate to provide light communication channels between the interior of said inner chamber and the interior of said housing, first light reflecting means supported within said housing to reflect light penetrating said lower aperture through said aligned upper apertures and along a path parallel to said top plate in the space between said top plate and said housing; said inner chamber containing a top sheet feeding system comprising a pair of parallel moving belt groups between which a sheet member is moved, a bottom sheet feeding system comprising a pair of parallel moving belt groups between which a sheet member is moved, a discharge terminal for said bottom sheet feeding system, a receiving terminal for said top sheet feeding system, said discharge and receiving terminals being in parallel spaced relation to provide an open space across which a sheet to be photographed is moved, means responsive to the approach of a sheet to said open space to illuminate opposite sides of said sheet as it traverses said open space, second light reflecting means for reflecting the images of opposite sides of the sheet traversing said open space through said lower aperture, and a camera mounted within said housing but without said inner chamber, said camera including means for projecting light passing through said aligned upper apertures and between said top plate and said housing onto a light sensitive film contained within said camera.

2. The micro-film apparatus defined in claim 1 further including a shutter means adjustably mounted adjacent the upper aperture of said second side plate, and means for yieldably retaining said shutter means in different positions of adjustment across said upper aperture of said second side plate, at least one of said positions of adjustment being such that said shutter prevents the image from one side of a sheet passing through said open space from being projected onto a film in said camera.

3. The micro-film apparatus defined in claim 1 wherein said top sheet feeding system comprises a discharge terminal, and further including a tray mounted in said frame and extending from said top sheet feeding system discharge terminal to the exterior of said housing for collecting sheets fed through said apparatus, said tray also serving as a baffle to prevent external light from penetrating said housing.

4. The micro-film apparatus defined in claim 1 further including means for supporting said first and second reflecting means, said first and second light reflecting means comprising elongated mirrors, and said supporting means comprising clip means on opposite ends of said mirrors, and pin means within said housing for supporting said clip means.

References Cited in the file of this patent

UNITED STATES PATENTS 2,504,734    Schmidling  ---------- Apr. 18, 1950

(Other references on following page)

UNITED STATES PATENTS

| | | |
|---|---|---|
| 2,529,943 | Hopkins | Nov. 14, 1950 |
| 2,552,266 | Egan et al. | May 8, 1951 |
| 2,557,026 | Budde | June 12, 1951 |
| 2,565,074 | Halahan et al. | Aug. 21, 1951 |
| 2,578,037 | Berlant | Dec. 11, 1951 |
| 2,578,254 | Lee | Dec. 11, 1951 |
| 2,578,320 | Schubert | Dec. 11, 1951 |
| 2,615,365 | Johnson | Oct. 28, 1952 |
| 2,682,194 | Rosenburgh | June 29, 1954 |
| 2,823,579 | Fitter | Feb. 18, 1958 |
| 2,845,841 | Collins | Aug. 5, 1958 |